US010230832B2

United States Patent
Criou et al.

(10) Patent No.: US 10,230,832 B2
(45) Date of Patent: Mar. 12, 2019

(54) REMOTE ASSISTANCE FOR A MOBILE COMMUNICATIONS TERMINAL

(71) Applicant: DORO AB, Malmö (SE)

(72) Inventors: Acher Criou, Neuilly-sur-Seine (FR); Emmanuel Freund, Paris (FR); Arthur Chevallier, Paris (FR); Pierre Broggi, Paris (FR)

(73) Assignee: Doro AB, Malmö (SE)

( * ) Notice: Subject to any disclaimer, the term of this patent is extended or adjusted under 35 U.S.C. 154(b) by 0 days.

(21) Appl. No.: 15/323,363

(22) PCT Filed: Jun. 29, 2015

(86) PCT No.: PCT/EP2015/064731
§ 371 (c)(1),
(2) Date: Dec. 30, 2016

(87) PCT Pub. No.: WO2016/001162
PCT Pub. Date: Jan. 7, 2016

(65) Prior Publication Data
US 2017/0163793 A1 Jun. 8, 2017

(30) Foreign Application Priority Data

Jul. 4, 2014 (EP) .................................. 14290197
Sep. 1, 2014 (EP) .................................. 14290260

(51) Int. Cl.
*H04M 1/725* (2006.01)
*H04L 29/08* (2006.01)
(Continued)

(52) U.S. Cl.
CPC ........ *H04M 1/72577* (2013.01); *G06F 9/547* (2013.01); *G08C 17/02* (2013.01);
(Continued)

(58) Field of Classification Search
CPC .......... H04M 1/72577; H04M 1/72527; H04L 41/5064; H04L 67/125; H04L 67/34; G08C 17/02; G08C 2201/93; G06F 9/547
See application file for complete search history.

(56) References Cited

U.S. PATENT DOCUMENTS 8,655,340 B2 * 2/2014 Sherman ........... H04M 3/42178
455/414.1
2005/0044232 A1 2/2005 Keane
(Continued)

FOREIGN PATENT DOCUMENTS

EP 2680532 A1 1/2014
EP 2722755 A2 4/2014

OTHER PUBLICATIONS

International Search Report for PCT/EP2015/064731, dated Aug. 26, 2015.

*Primary Examiner* — Wayne H Cai
(74) *Attorney, Agent, or Firm* — Merchant & Gould P.C.

(57) ABSTRACT

A mobile communications terminal is disclosed which comprises a user interface and a controller, wherein the controller is configured to receive runtime data from a second mobile communications terminal; compile a compiled overall status for the second mobile communications terminal based on the runtime data; present the compiled overall status through the user interface; and receive user input through the user interface, the user input indicating a control command and/or data to be shared. If the user input indicates a control command, the control command is sent to the second mobile communications terminal, thereby causing the second mobile communications terminal to execute the control command. If the user input indicates data to be shared, the data to be shared is sent to the second mobile
(Continued)

communications terminal, thereby causing the second mobile communications terminal to present the data to be shared.

17 Claims, 6 Drawing Sheets

(51) Int. Cl.
  *G06F 9/54* (2006.01)
  *H04L 12/24* (2006.01)
  *G08C 17/02* (2006.01)

(52) U.S. Cl.
  CPC ........ *H04L 41/5064* (2013.01); *H04L 67/125* (2013.01); *H04M 1/72527* (2013.01); *G08C 2201/93* (2013.01); *H04L 67/34* (2013.01)

(56) References Cited

U.S. PATENT DOCUMENTS

| | | |
|---|---|---|
| 2010/0211594 A1 | 8/2010 | Penders et al. |
| 2011/0029241 A1 | 2/2011 | Miller et al. |
| 2013/0007662 A1* | 1/2013 | Bank ................ G06F 9/4443 715/811 |
| 2013/0263287 A1 | 10/2013 | Ayyalasomayajula |
| 2014/0129612 A1 | 5/2014 | Hamilton et al. |
| 2015/0379262 A1* | 12/2015 | Islam ................ G06F 21/51 726/22 |

* cited by examiner

REMOTE ASSISTANCE FOR A MOBILE COMMUNICATIONS TERMINAL

This application is a National Stage application of PCT/EP2015/064731, filed 29 Jun. 2015, which claims benefit of European Patent Application No. 14290197.4, filed 4 Jul. 2014 and European Patent Application No. 14290260.0, filed 1 Sep. 2014, which applications are incorporated herein by reference. To the extent appropriate, a claim of priority is made to each of the above disclosed applications.

TECHNICAL FIELD

This application relates to methods, mobile communications terminals, a system and a computer-readable storage medium for improved remote assistance for a mobile communications terminal, and in particular to methods, mobile communications terminals, a system and a computer-readable storage medium for improved remote assistance for a mobile communications terminal belonging to a technically inapt user.

BACKGROUND

Contemporary mobile communications terminals are becoming more and more advanced and offer an almost endless array of possibilities to a user. It is, as such, difficult for a technically inapt user, such as an elderly person with little or no experience of mobile communications terminals, to handle their terminals and/or to operate them to their fullest.

Many systems exist where a technically skilled user may offer remote assistance based on assuming control of the terminal of the technically inapt user. However, such solutions suffer from the drawbacks that it may be difficult for the technically inapt user to properly describe the problem experienced to the technically skilled user, thereby necessitating time consuming problem finding for the technically skilled user, and that the technically inapt user may not understand what the technically skilled user is doing and thus does not learn how to use his terminal. There is also a risk of malicious use threatening the personal integrity and security of the technically inapt user and his terminal, as full control of the terminal is surrendered to the technically skilled user.

Another problem when offering remote assistance is that the technically inapt user may not understand the instructions given to him by a technically skilled user, or the technically inapt user's terminal may be configured wrongly in such a way that it is impossible for the technically skilled user to convey his instructions properly.

The U.S. patent application published as US2014129612A1 discloses methods, systems, and apparatus for providing assistance to a user of a mobile application are described. A request for assistance from the user is detected and a request is issued to a remote device for establishment of a remote assistance session. Information describing a state of the mobile device is periodically transmitted to the remote device and one or more commands may be received from the remote device. The commands may be executed on the mobile device.

The U.S. patent application published as US2011029241A1 discloses a personal navigation system, including: at least one inertial sensor module associated with a user, the inertial sensor module comprising at least one sensor to generate location data associated with the user; a communication device to receive and/or transmit at least a portion of the location data; and an onsite computer to communicate with the communication device and receive at least a portion of the location data; wherein at least one of the inertial sensor module and the onsite computer is configured to determine at least one activity of the user based at least in part upon the location data; wherein the onsite computer is programmed to configure a display including a representation of the user based at least in part upon the location data; wherein at least one of the determination and the configuration is performed substantially in real-time.

There is thus a need for an improved manner of providing remote assistance.

SUMMARY

It is an object of the teachings of this application to overcome the problems listed above by providing a mobile communications terminal comprising a user interface and a controller, wherein the controller is configured to receive runtime data from a second mobile communications terminal; compile a compiled overall status for the second mobile communications terminal based on the runtime data; present the compiled overall status through the user interface; and receive user input through the user interface, the user input indicating a control command and/or data to be shared. If the user input indicates a control command, the controller is configured to send the control command to the second mobile communications terminal, thereby causing the second mobile communications terminal to execute the control command, wherein the control command relates to a control function of the second mobile communications terminal, thereby preventing full control of the second mobile communications terminal, only allowing control of a set of control functions. If the user input indicates data to be shared, the controller is configured to send the data to be shared to the second mobile communications terminal, thereby causing the second mobile communications terminal to present the data to be shared.

This allows for a remote user to alleviate problems that may give rise to an overall status indication affecting also functions that are not currently activated without having to activate such functions and/or to take active control of the second mobile communications terminal. An erroneously setting may thus be corrected with a single input from the remote terminal.

The teachings herein thus provide for a remote user to ascertain an erroneously set setting, and to alleviate this error without taking any control of the mobile communications terminal or take part of any content stored thereon thereby preserving the personal integrity of the user of the mobile communications terminal.

This saves both time as well as communication resources, both relating to processor power and to communication interface resources (power and bandwidth).

It is an object of the teachings of this application to overcome the problems listed above by providing a mobile communications terminal comprising a controller, wherein the controller is configured to: collect runtime data; transmit the runtime data to a first mobile communications terminal; receive a control command and/or data to be shared from the first mobile communications terminal; and if a control command is received, execute the control command, and/or if data to be shared is received, present the data to be shared.

It is an object of the teachings of this application to overcome the problems listed above by providing a system comprising a first mobile communications terminal and a second mobile communications terminal, wherein the second mobile communications terminal is configured to collect runtime data and transmit the runtime data to the first mobile communications terminal, wherein the first mobile communications terminal is configured to: receive the runtime data from the second mobile communications terminal; compile a compiled overall status for the second mobile communications terminal based on the runtime data; present the compiled overall status through the user interface; receive user input through the user interface, the user input indicating a control command and/or data to be shared; and if the user input indicates a control command, send the control command to the second mobile communications terminal, thereby causing the second mobile communications terminal to execute the control command, wherein the control command relates to a control function of the second mobile communications terminal, thereby preventing full control of the second mobile communications terminal, only allowing control of a set of control functions, and/or if the user input indicates data to be shared, send the data to be shared to the second mobile communications terminal, thereby causing the second mobile communications terminal to present the data to be shared, wherein the second mobile communications terminal is further configured to: receive the control command and/or the data to be shared from the first mobile communications terminal; and if a control command is received, execute the control command, and/or if data to be shared is received, present the data to be shared.

It is an object of the teachings of this application to overcome the problems listed above by providing a method for use in a mobile communications terminal comprising a user interface, wherein the method comprises: receiving runtime data from a second mobile communications terminal; compiling a compiled overall status for the second mobile communications terminal based on the runtime data; presenting the compiled overall status through the user interface; receiving user input through the user interface, the user input indicating a control command and/or data to be shared; and if the user input indicates a control command, sending the control command to the second mobile communications terminal, thereby causing the second mobile communications terminal to execute the control command, wherein the control command relates to a control function of the second mobile communications terminal, thereby preventing full control of the second mobile communications terminal, only allowing control of a set of control functions, and/or if the user input indicates data to be shared, sending the data to be shared to the second mobile communications terminal, thereby causing the second mobile communications terminal to present the data to be shared.

It is an object of the teachings of this application to overcome the problems listed above by providing a method for use in a mobile communications terminal, wherein the method comprises: collecting runtime data; transmitting the runtime data to a first mobile communications terminal; receiving a control command and/or data to be shared from the first mobile communications terminal; and if a control command is received, executing the control command, and/or if data to be shared is received, presenting the data to be shared.

It is an object of the teachings of this application to overcome the problems listed above by providing a method for use in a system comprising a first mobile communications terminal and a second mobile communications terminal, wherein the method comprises: the second mobile communications terminal collecting runtime data and transmitting the runtime data to the first mobile communications terminal; and the first mobile communications terminal receiving the runtime data from the second mobile communications terminal; compiling a compiled overall status for the second mobile communications terminal based on the runtime data; presenting the compiled overall status through the user interface; receiving user input through the user interface, the user input indicating a control command and/or data to be shared; and if the user input indicates a control command, sending the control command to the second mobile communications terminal, thereby causing the second mobile communications terminal to execute the control command, wherein the control command relates to a control function of the second mobile communications terminal, thereby preventing full control of the second mobile communications terminal, only allowing control of a set of control functions, and/or if the user input indicates data to be shared, sending the data to be shared to the second mobile communications terminal, thereby causing the second mobile communications terminal to present the data to be shared, wherein the method further comprises the second mobile communications terminal receiving the control command and/or the data to be shared from the first mobile communications terminal; and if a control command is received, executing the control command, and/or if data to be shared is received, presenting the data to be shared.

It is also an object of the teachings of this application to overcome the problems listed above by providing a computer-readable storage medium encoded with instructions that, when executed on a processor, perform any of the methods according to the above.

This allows for a technically skilled user to offer and also provide remote assistance to a technically inapt user without taking control of the user interface of the technically inapt user's terminal. The technically skilled user is thus able to execute certain control commands that enables the terminal of the technically inapt user to function properly and avoid critical events, such as low battery warnings, from occurring. By enabling the technically skilled user to control various aspects, such as volume control, the technically skilled user may take actions to ensure that the technically inapt user is able to receive and understand his instructions. For example, the technically skilled user may remotely increase the speaker volume on the technically inapt user's terminal to ensure that the technically inapt user can hear any instructions spoken by the technically skilled user.

The inventors of the present invention have realized, after inventive and insightful reasoning, that by compiling a compiled overall status for a technically inapt user's terminal based on runtime data and presenting this to a technically skilled user, without at first giving too many details on the runtime data, and by offering the technically skilled user options for changing the operation of the technically inapt user's terminal remotely, the technically skilled user may control certain aspects of the technically inapt user's terminal without affecting the integrity or security of the technically inapt user's terminal.

As the control might be limited to a few controls, the risk of a malicious use is greatly reduced and the personal integrity of the technically inapt user is also safeguarded.

The technically skilled user is thus provided with a compiled indicator of the internal status of the second terminal, and based on this, the technically skilled user may provide technical support that effects the operation of the technically inapt user's terminal by for example remotely executing commands on the technically inapt user's terminal.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The teachings herein will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
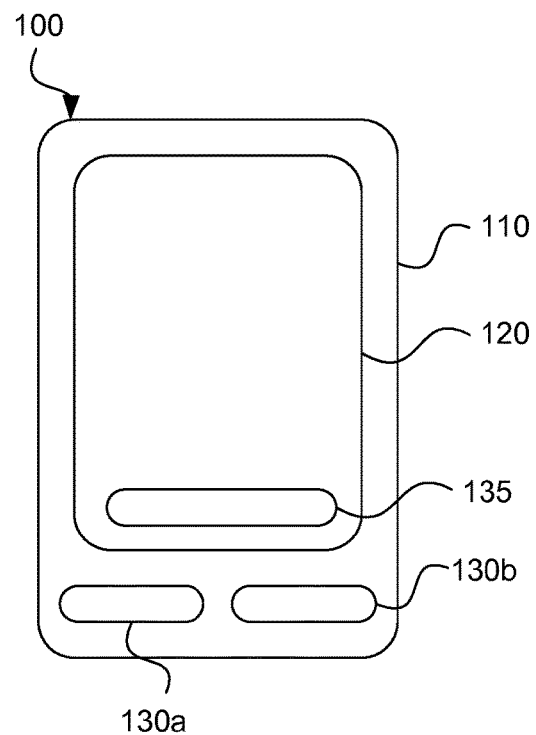
FIG. 1 shows a schematic view of a mobile communications terminal according to one embodiment of the teachings of this application.

FIG. 1 shows a schematic overview of a mobile communications terminal 100 adapted according to the teachings herein. In the embodiment shown the mobile communications terminal is a mobile phone 100. In other embodiments the mobile communications terminal 100 is computer tablet, a laptop computer, a personal digital assistant, a media player, a location finding device or any hand-held device capable of communicating with other devices. The mobile phone 100 comprises a housing 110 in which a display 120 is arranged. In one embodiment the display 120 is a touch display. In other embodiments the display 120 is a non-touch display. Furthermore, the mobile phone 100 comprises two keys 130a, 130b. In this embodiment there are two keys 130, but any number of keys, including none, is possible and depends on the design of the mobile phone 100. In one embodiment the mobile phone 100 is configured to display and operate a virtual key 135 on the touch display 120. It should be noted that the number of virtual keys 135 are dependent on the design of the mobile phone 100 and an application that is executed on the mobile phone 100. In one embodiment the communications terminal 100 comprises an ITU-T keypad or a QWERTY (or equivalent) keypad in addition to or as an alternative to a touch-sensitive display. In one embodiment where the keypad is an alternative to a touch-sensitive display, the display 120 is a non-touch-sensitive display.

The mobile phone may be navigated through touch input (if the display 120 is a touch display) or input using physical keys 130 or a combination of the two. In the description below there will be made no difference between use of physical keys to scroll between labels such as soft key labels or other manners of presenting options, and the use of virtual keys.

Figure 2:
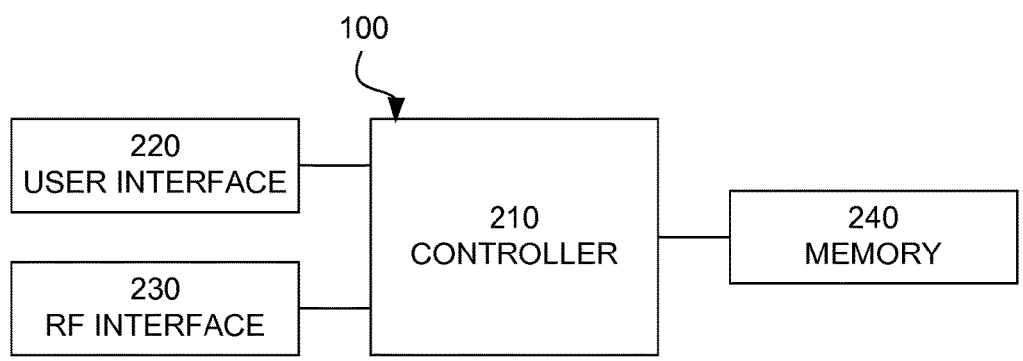
FIG. 2 shows a schematic view of the general structure of a mobile communications terminal according to one embodiment of the teachings of this application.

FIG. 2 shows a schematic view of the general structure of a mobile communications terminal 100 according to FIG. 1. The mobile communications terminal 100 comprises a controller 210 which is responsible for the overall operation of the mobile communications terminal 100 and is preferably implemented by any commercially available CPU ("Central Processing Unit"), DSP ("Digital Signal Processor") or any other electronic programmable logic device. The controller 210 is implemented using instructions that enable hardware functionality, for example, by using computer program instructions executable in a general-purpose or special-purpose processor that may be stored on a computer readable storage medium (disk, memory etc) 240 to be executed by such a processor. The controller 210 is configured to read instructions from the memory 240 and execute these instructions to control the operation of the mobile communications terminal 100. The memory 240 may be implemented using any commonly known technology for computer-readable memories such as ROM, RAM, SRAM, DRAM, CMOS, FLASH, DDR, EEPROM memory, flash memory, hard drive, optical storage or any combination thereof. The memory 240 is used for various purposes by the controller 210, one of them being for storing application data and various software modules in the mobile terminal. The software modules include a real-time operating system, an application handler as well as various applications. The applications are sets of instructions that when executed by the controller 210 control the operation of the mobile communications terminal 100.

The mobile communications terminal 100 further comprises drivers for a user interface 220, which in the mobile communications terminal 100 of FIG. 1 is comprised of the display 120, the keys 130, 135, a microphone and a loudspeaker. The user interface (UI) drivers 220 also includes one or more hardware controllers, which together with the UI drivers cooperate with the display 120, keypad 130, as well as various other I/O devices such as microphone, loudspeaker, vibrator, ringtone generator, LED indicator, etc. As is commonly known, the user may operate the mobile terminal through the man-machine interface thus formed.

The mobile communications terminal 100 further comprises a radio frequency interface 230, which is adapted to allow the mobile communications terminal to communicate with other communication terminals in a radio frequency band through the use of different radio frequency technologies. Examples of such technologies are W-CDMA, GSM, UTRAN, LTE and NMT to name a few. The controller 210 is configured to operably execute the applications 250, such as the voice call and message handling applications, through the RF interface 230 and software stored in the memory 240, which software includes various modules, protocol stacks, drivers, etc. to provide communication services (such as transport, network and connectivity) for the RF interface 230, and optionally a Bluetooth interface and/or an IrDA interface for local connectivity. The RF interface 230 comprises an internal or external antenna as well as appropriate radio circuitry for establishing and maintaining a wireless link to a base station. As is well known to a person skilled in the art, the radio circuitry comprises a series of analogue and digital electronic components, together forming a radio receiver and transmitter. These components include, i.e., band pass filters, amplifiers, mixers, local oscillators, low pass filters, AD/DA converters, etc.

Figure 3:
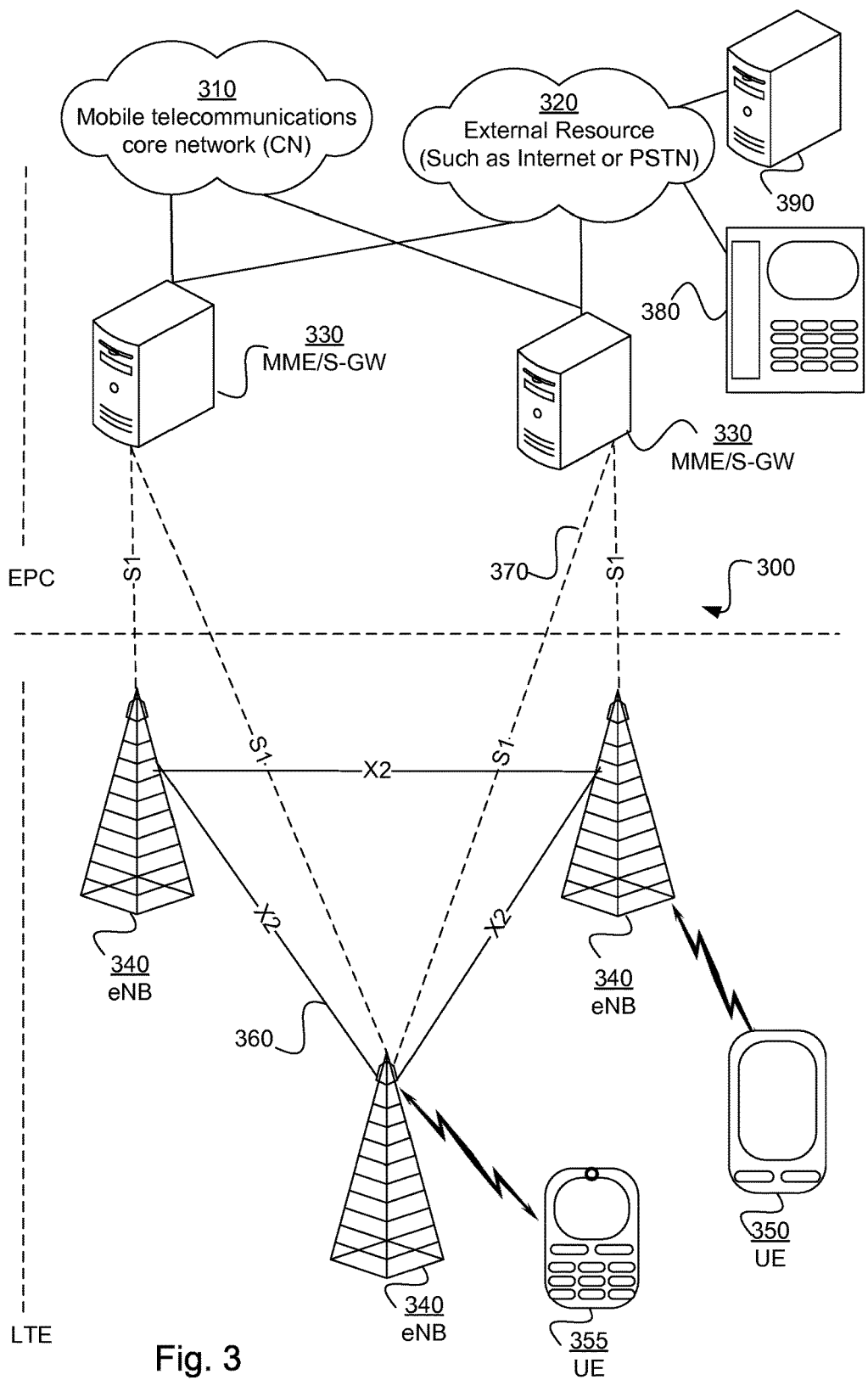
FIG. 3 show a schematic view of a telecommunications network according to one embodiment of the teachings of this application.

FIG. 3 shows a schematic view of the general structure of a telecommunications system 300 according to the teachings herein. In the telecommunication system of FIG. 3, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100, 300, 350 according to the disclosed embodiments and other communications terminals, such as another mobile terminal 355 or a stationary telephone 380. The mobile terminals 350, 355 are connected to a mobile telecommunications network 310 through Radio Frequency links via base stations 340.

The telecommunications system 300 comprises at least one server 330. A server 330 has a data storage and a controller that is implemented by any commercially available CPU ("Central Processing Unit"), DSP ("Digital Signal Processor") or any other electronic programmable logic device. In one embodiment such a server is a Mobility Management Entity (MME). In one embodiment such a server is a Gateway (GW). The servers 330 are configured to communicate with a mobile telecommunications core network (CN) 310 and/or an external resource 320 such as the internet or a Public Switched Telephone Network (PSTN). A PSTN 320 is configured to communicate with and establish communication between stationary or portable telephones 380. In one embodiment the external resource comprises or is configured to communicate with an external service provider 390. In one embodiment the servers 330 are configured to communicate with other communications terminals using a packet switched technology or protocol. In such an embodiment the servers 330 may make up an Evolved Packet Core (EPC) layer.

The servers 330 are configured to communicate with nodes, also referred to as base stations 340. In one embodiment the base station 340 is an evolved Node Base (eNB). A base station 340 is further configured to communicate with a server 330. In one embodiment the communication between a server 330 and a base station 340 is effected through a standard or protocol 370. In one embodiment the protocol is S1. A base station 340 is configured to communicate with another base station 340. In one embodiment the communication between a base station 340 and another base station 340 is effected through a standard or protocol 360. In one embodiment the protocol 360 is X2. A base station 340 is further configured to handle or service a cell 380. In one embodiment the at least one base stations 340 make up a Long Term Evolution (LTE) layer. In one embodiment the at least one base stations 340 make up an LTE Advanced layer.

In one embodiment the base station 340 is configured to communicate with a mobile communications terminal 330 (100) through a wireless radio frequency protocol.

In one embodiment the telecommunications system 300 is an Evolved Packet System (EPS) network. In one embodiment the telecommunications system is a system based on the 3GPP (3$^{rd}$ Generation Partnership Project) standard. In one embodiment the telecommunications system is a system based on the UMTS (Universal Mobile Telecommunications System) standard. In one embodiment the telecommunications system is a system based on a telecommunications standard such as GSM, D-AMPS, CDMA1000, FOMA or TD-SCDMA.

As would be apparent to a skilled reader, a computer-enabled communications network, such as the Internet or a telecommunications network, provides many possibilities and variations of how to connect two terminals, and the embodiments disclosed herein are for purely exemplary purposes and should not be construed to be limiting.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 4:
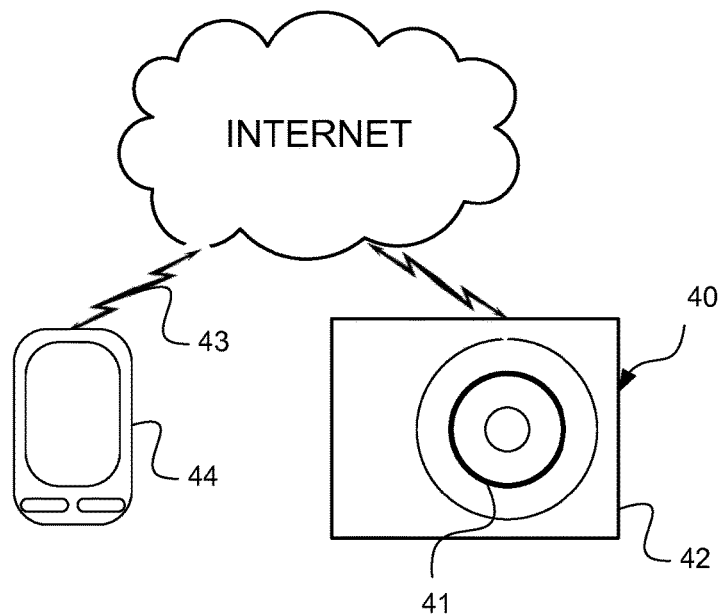
FIG. 4 shows a schematic view of a computer-readable medium according to one embodiment of the teachings herein.

FIG. 4 shows a schematic view of a computer-readable storage medium, such as a computer-readable storage medium, as described in the above. The computer-readable medium 40 is in this embodiment a data disc 40, being an example of a tangible computer-readable medium. In one embodiment the data disc 40 is a magnetic data storage disc. The data disc 40 is configured to carry instructions 41 that when loaded into a controller, such as a processor, execute a method or procedure according to the embodiments disclosed above. The data disc 40 is arranged to be connected to or within and read by a reading device 42, for loading the instructions into the controller. One such example of a reading device 42 in combination with one (or several) data disc(s) 40 is a hard drive. It should be noted that the computer-readable medium can also be other mediums such as compact discs, digital video discs, flash memories or other memory technologies commonly used.

The instructions 41 may also be downloaded to a computer data reading device 44, such as a mobile communications terminal 44 or other device capable of reading computer coded data on a computer-readable medium, by comprising the instructions 41 in a computer-readable signal 43 which is transmitted via a wireless (or wired) interface (for example via the Internet) to the computer data reading device 44 for loading the instructions 41 into a controller. In such an embodiment the computer-readable signal 43 is one type of a (non-tangible) computer-readable medium 40.

The instructions may be stored in a memory (not shown explicitly in FIG. 4, but referenced 240 in FIG. 2) of the mobile communications terminal 44.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 5:
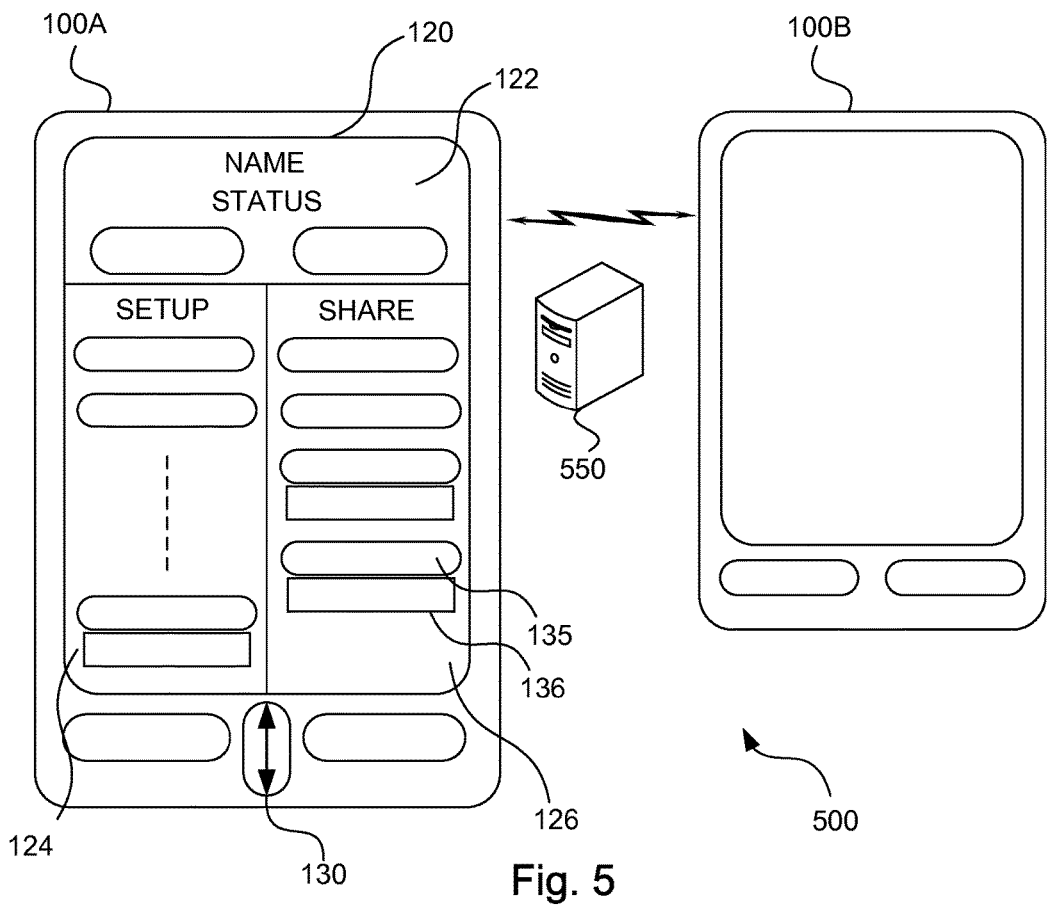
FIG. 5 shows a schematic overview of a communications system according to an embodiment herein.

FIG. 5 shows a schematic overview of a communications system 500 according to an embodiment herein. The communication system comprises a first terminal 100A, such as the mobile communications terminal 100 of FIG. 1 or 2, which is arranged to communicate with a second terminal 100B, such as the mobile communications terminal 100 of FIG. 1 or 2, for example through the internet or a telecommunications network as per FIG. 3. The communication system 500 may further comprise at least one server 550 for providing for example information to the first terminal 100A about the second terminal 100B.

The first terminal 100A is arranged with a remote assistance application which enables a technically skilled user to assist a technically inapt user of the second terminal 100B.

The second terminal 100B is therefore arranged with a runtime data retrieving application which retrieves runtime data on the operation of the second terminal 100B and sends the status data to the first terminal 100A.

The runtime data may be retrieved upon a request from the first terminal or regularly or upon an event by the second terminal 100B.

The runtime data correlating to an internal characteristic or internal status of an application or the device, which characteristic or status may not currently be visibly presented. The runtime data is not related to a simple screen dump or other means of purveying what is currently displayed on the second mobile communication terminal's display.

The runtime data may relate to battery level, memory usage, application usage, number of user interface actuations, such as key presses—both virtual and physical, for use of an application, number of missed calls (indicating a too low ringtone volume), number of unread messages (indicating a too low incoming message signal), number of error messages received relating email (indicating a wrongly set up email account or contact), to name a few aspects.

The first terminal 100A is configured to display three segments on the display 120 for providing the technically skilled user with information on the second terminal 100B and also controls for offering assistance to the technically inapt user of the second terminal 100B.

It should be noted that even though the description herein is directed at displaying three segments, it should be clear that any number of segments may be displayed and the information and controls displayed in the various segments may be grouped or combined in different manners while still being included in the general teachings of this application.

In the example embodiment of FIG. 5, the first terminal 100A is arranged to display a status segment 122 where a compiled status and possibly the identity or name of the technically inapt user is displayed. Some control options may also be displayed, as will be discussed below, in the status segment 122. Controls are displayed in a control segment 124. The controls may be displayed as virtual keys and/or fields and offer a technically skilled user to issue controls that are to be effectuated by the second terminal 100B. A data sharing segment 126 is also displayed which enables a technically skilled user to share data with the technically inapt user. Such data may be, but is not limited to, exchanging data files, contacts or tutorials, either directly or indirectly by sharing an identifier, such as a link or an address, for download of the data. By allowing a technically skilled user to share data with the technically inapt user, the technically skilled user is enabled to execute certain tasks on behalf of the technically inapt user without taking control of the technically inapt user's second terminal 100B by simply sharing the result of such tasks. For example, instead of allowing the technically skilled user to create a contact on the technically inapt user's second terminal 100B, the technically skilled user can create the contact on his first terminal 100A and share the created contact with the technically inapt user.

The server 550 may be contacted by the technically skilled user's first terminal 100A to request further data regarding the second terminal 100B. The server 550 may also be used for (intermediate) storage of data files to be shared. The server 550 may also be contacted by terminal 100A and/or 100B to request runtime data regarding network usage or other network data.

Figure 6:
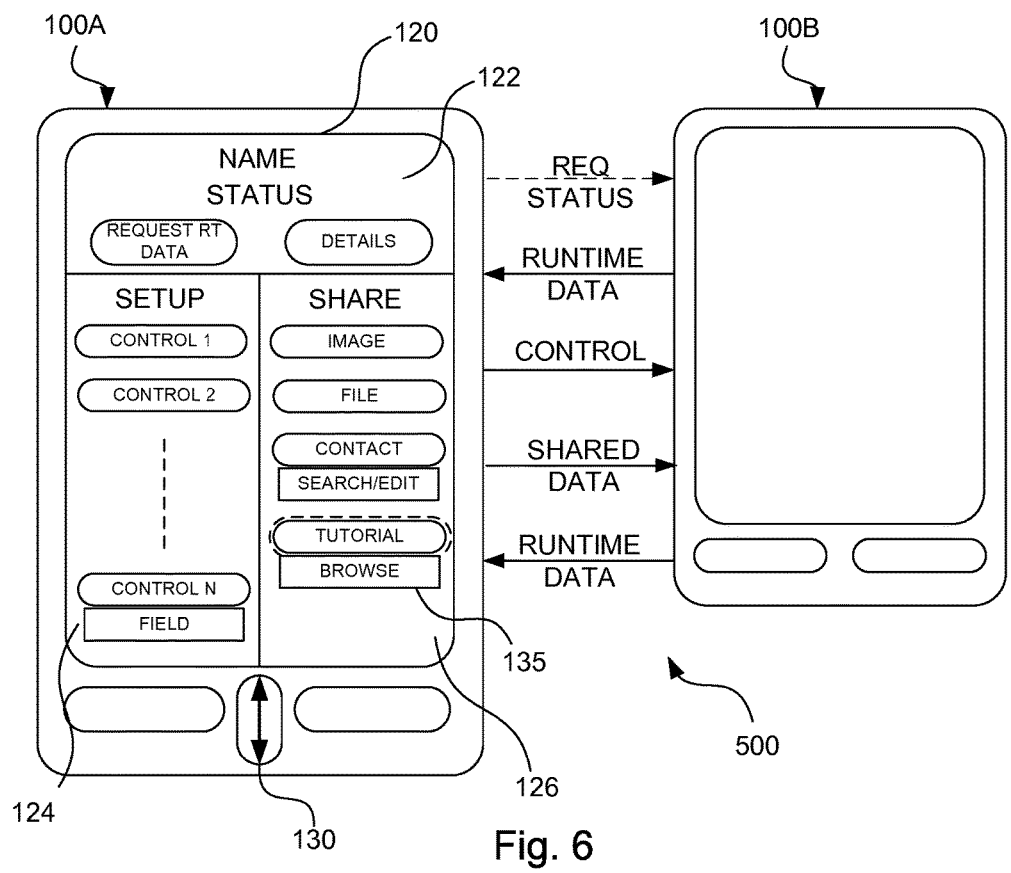
FIG. 6 shows an example embodiment of a communication system arranged for remote assistance according to one embodiment of the teachings herein.

The server 550 may also be configured and used for (temporary) storage of runtime data collected by the second terminal 100B and to be delivered or sent to the first terminal 100A. This is useful when there is currently no active data communication channel between the first terminal 100A and the second terminal 100B, wherein the server 550 then acts as a buffer. In one embodiment, the server 550 may also be configured to compile the compiled overall status partially or fully and/or rank the various aspects of the runtime data before sending the runtime associated data to the first terminal 100A. The compiled overall status is thus automatically determined and relates to runtime data concerning possibly several aspects, currently activated or not and/or currently visible or not FIG. 6 shows an example embodiment of a communication system 500 arranged for remote assistance according to herein. The first terminal 100A receives a runtime data message from the second terminal 100B. As is indicated by the dashed arrow, the runtime data message may be compiled and sent by the second terminal 100B upon receiving a request for a status update from the first terminal 100A.

Such a request may be issued manually by the technically skilled user activating a request runtime data option in the remote assistance application, which option is illustrated as a virtual key in FIG. 6.

As the first terminal 100A receives the runtime data, it analyzes the data and compiles a compiled overall status for the second terminal 100B. The compiled overall status is based on usage factors such as memory consumption, battery level (and also battery consumption), missed calls, frequency of use for specific application(s), error messages received for application/action.

The compiled overall status is thus not a status for a single application, function or resource of the terminal, but a collation of statuses for different applications, functions or resources, which are compiled to indicate a compiled overall status of a terminal. By combining various runtime into one aspect, further aspects of the usage may be determined, such as indicating that a user is in need of assistance—given remotely by a second user.

Such a compilation also carries the benefit that the status of the device is determined automatically and the internal status of the terminal is thus provided to a user without the user—or the other user—having to ascertain the runtime data and make any conclusions based on the runtime data—a process which may require substantive information gathering through many different applications and interfaces before a reasonably safe conclusion can be made.

The status of a single application or resource may be provided through the runtime time and the run time data thus may include statuses for individual applications (such as error messages to give one example) and/or resources (such as memory usage to give one example).

Examples of resources are memory usage, processor usage, battery usage, sound levels (which may also be given as a status for an application), Radio Frequency communication interface usage (is the WiFi or Bluetooth (for example) often switched off) to name a few.

The compiled status may be based on an individual assessment of each aspect for the runtime data.

The compiled status may be based on a weighted sum of rankings of such runtime data or the compiled status may be based on an individual ranking of each aspect for the runtime data.

In one embodiment where the first terminal 100A is configured to determine the compiled overall status based on a weighted sum of rankings or on an individual ranking, the first terminal 100A is configured to rank each aspect of the runtime data. An aspect may be related to a specific use or component, such as battery level for example. A ranking of the battery level may be linear or divided into steps. One example of a stepwise ranking for the battery level is shown below.

| Battery level | Ranking |
| --- | --- |
| 100%-80% | 10 |
| 80%-50% | 9 |
| 50%-40% | 8 |
| 40%-30% | 7 |
| 30%-25% | 6 |
| 25%-20% | 5 |
| 20%-16% | 4 |
| 16%-12% | 3 |
| 12%-8% | 2 |
| 8%-5% | 1 |
| <5% | 0 |

A ranking of 10 indicates a proper usage and a lower ranking indicates that something is not operating at optimum conditions. High rankings will therefore lead to a high compiled overall status which will indicate a proper usage, whereas a low ranking will indicate that the technically inapt user is not fully aware of a function and that assistance may be needed.

Another aspect related to battery level is how quickly the battery level drops. A fast decline in battery level may indicate an improper usage. It may also indicate that the technically inapt user may not be aware that he can take actions to reduce the rate of battery power consumption. An example of an action to be taken to reduce the battery power consumption is to reduce the brightness level of the display 120.

The first terminal 100A is thus configured to rank the various aspects of the runtime data and compile a compiled overall status and present this compiled overall status through the user interface of the first terminal 100A.

It should be noted that presenting in the context of this application should be understood to include displaying both still images and moving images, playing sound or audio files, displaying text, playing speech derived from text using various text-to-speech technologies, and also to indirectly present data by providing an identifier, such as a link or address for download of the data to be presented.

The compiled overall status may thus be presented in the status segment 122 of the display as a key word or text (e.g. good, acceptable, bad), an image (e.g. happy smiley, sad smiley), a color (e.g. green, yellow, red), a link to the server 550 for retrieving the status (if the compiled overall status has been compiled by the server 550), and also in other manners.

In one embodiment, the compiled overall status is compiled as being the average of all or most of the rankings. In another embodiment, the compiled overall status is compiled as being the lowest ranking.

The compiled overall status enables the technically skilled user to get a quick overview of the status for the technically inapt user without having to browse through all details available on the technically inapt user's usage of the second terminal 100B.

Should the technically skilled user want to see more details about the status of the technically inapt user, an option for displaying further details may be presented and selected by the technically skilled user.

To enable the technically skilled user to provide remote assistance to the technically inapt user, the first terminal is configured to display or otherwise present one or more control options. These may be displayed in the setup or control segment 124 as virtual keys or by other means known to a skilled person.

In one embodiment, the control options displayed correspond to respective control functions to be executed by the second terminal 100B. By only displaying control options that correspond to control functions of the second terminal a technically skilled user will be prevented from taking over control of the technically inapt user's second terminal completely, thereby safeguarding the personal integrity of the technically inapt user and also reducing the risk of any malicious use. This while still enabling the technically skilled user to provide assistance through the selected control functions. The control functions possibly being to turn on/off an RF interface (WiFi, Bluetooth®, to name some examples), to raise/lower a sound level, and/or to increase/decrease illumination of the screen to name a few examples.

The skilled user of the first terminal is thus allowed or enabled to issue control commands for affecting also functions that are not currently visible on the second mobile communications terminal for alleviating a problematic situation as indicated by the compiled overall status, without taking control of the user interface of the second mobile communications terminal.

A control command may therefore be sent from the first terminal 100A to the second terminal 100B by actuating or selecting a control option at the first terminal 100A, whereby the second terminal, upon receiving the control command, executes the control command by executing the corresponding control function.

Using these control options the technically skilled user can take an action to improve the operation of the technically inapt user's second terminal 100B without having to be close to the second terminal 100B.

In one embodiment the first terminal 100A may be configured to indicate an action to be taken, possibly by highlighting the corresponding control (or data to be shared). In the example of FIG. 6 it is indicated that a tutorial should be shared. The first terminal 100A may be configured to determine the action to be taken by finding a correlation between a ranking, possibly one having a low ranking, and an action. The correlation may be stored in the first terminal or may be retrieved from the server 550. For example, a high number of missed calls would be correlated to increasing the ring tone volume and a high consumption of battery power would be correlated to reducing the brightness and also to share a tutorial on battery management (more on sharing tutorials in the below). A high number of error messages for an application or a feature may be correlated to a tutorial for the application or feature. A tutorial may also be correlated to other aspects of the runtime data. For example, a high number of missed calls may be correlated to a tutorial on ringtones and vibrations. A high memory usage may be correlated to a tutorial on memory management.

Some examples of actions to be taken to improve a compiled overall status based on the receive runtime status are discussed below.

If the runtime data indicates or includes a high memory usage, the technically skilled user may opt to perform some remote memory management. One control that could be enabled for the technically skilled user would be to initiate archiving or uploading of rarely accessed data files.

If the runtime data indicates a high number of error messages for an application or feature, the technically skilled user may opt to share a tutorial on the application or feature. The tutorial may be found through a correlation (stored or retrieved from the server 550) between the application or feature and the tutorial.

A tutorial may be shared by sending the actual tutorial or by sending an identifier, such as a link or address to the tutorial that causes the second terminal 100B to download or retrieve the tutorial. Using a standard library for tutorials provided by the server 550, the technically inapt user can trust that the tutorial is true and that the teachings of the tutorial will improve the technically inapt user's handling of the second terminal.

As in the above, it should be noted that presenting in the context of this application should be understood to include displaying both still images and moving images, playing sound or audio files, displaying text, playing speech derived from text using various text-to-speech technologies, and also to indirectly present data by providing an identifier, such as a link or address for download of the data to be presented.

The tutorial may thus be presented as a text, one or a series of images, moving or still, an audio file, a video file, a link to the server 550 for retrieving the tutorial, and also in other manners. As has been discussed in the above, the technically skilled user may opt to decrease the illumination/brightness of the display of the second terminal 100B if the runtime data indicates a high battery consumption.

As has been discussed in the above, the technically skilled user may opt to increase the ringtone volume of the second terminal 100B if the runtime data indicates a high number of missed calls or unread messages.

The technically skilled user is also enabled to offer remote assistance by the first terminal 100A being configured to present at least one option for sharing data files with the second terminal 100B. The technically skilled user may then offer remote assistance by sending files that are of interest to the technically inapt user, to generate and share data files that the technically inapt user is not able to generate (such as contacts) and/or to share tutorials that the technically inapt user would benefit from taking part of.

The options to share data may be presented as virtual keys, possibly associated with a field for searching or browsing for the file to be shared. As would be apparent to a skilled person, other options are also possible to associate with a sharing option.

Data may be shared as image, video, music or other media files, contact files, tutorial files (possibly being text, image, audio and/or video files) or indirectly through an identifier, such as a link or address, to downloadable data to be downloaded by the second terminal 100B.

As has been mentioned in the above, the options may be presented and selected as virtual keys 135, labels for physical keys and/or selectable items which can be scrolled through using the physical keys 130, or a combination of such options for presentation and selection.

In one embodiment, the first terminal is configured to receive runtime data from the second terminal, analyze the runtime data, possibly by ranking aspects of the runtime data and determine a tutorial related to at least one aspect and indicate this as a proposed tutorial to be shared. This may, in such an embodiment, be made without compiling a compiled overall status and/or without presenting other control options. A technically skilled user may thus provide assistance in selecting, possibly among many tutorials, a tutorial to be shared with the technically inapt user.

In one embodiment the server 550 may be configured to receive runtime data from the second terminal, analyze the runtime data, possibly by ranking aspects of the runtime data, determine a tutorial related to at least one aspect, and share the tutorial with the second terminal 100B.

Figure 7:
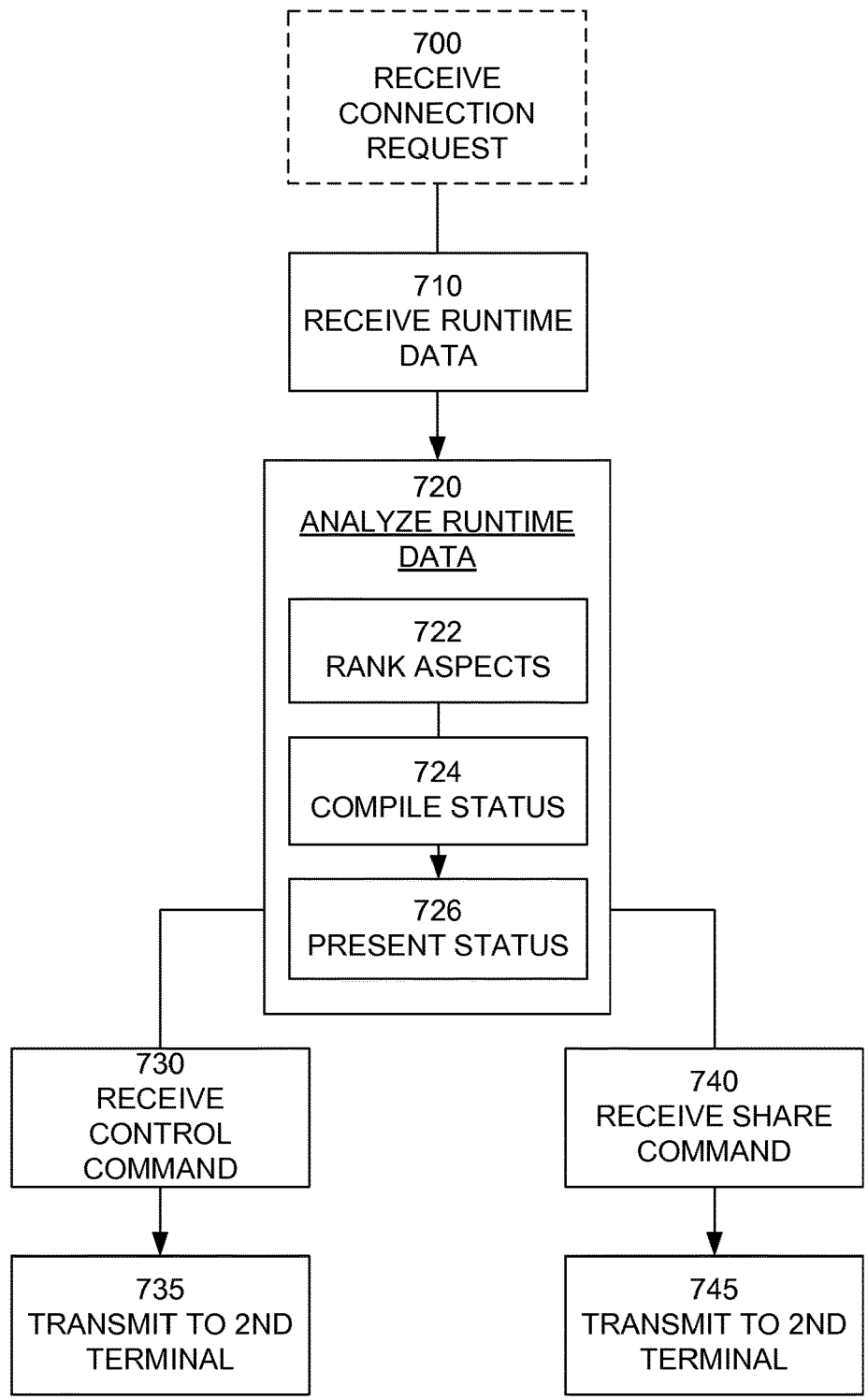
FIG. 7 shows a flowchart for a general method according to one embodiment of the teachings herein.

FIG. 7 shows a flowchart for a general method according to one embodiment of the teachings herein.

The first terminal 100A receives 710 runtime data from the second terminal 100B, possibly as a response to a request for runtime data. In one embodiment, the first terminal 100A may be configured to (regularly) request runtime data from the second terminal 100B. In one embodiment, the second terminal 100B may be configured to (regularly) send runtime data to the first terminal 100A without being prompted to do so by the first terminal 100A.

The first terminal 100A analyzes 720 the runtime data, possibly by ranking 722 different aspects of the runtime data and compiling a compiled overall status 724 which is presented 726, possibly on the display 120 of the first terminal 100A. Another manner of presenting the status is through a text to speech interface.

The first terminal then receives a control command 730 and/or a command to share data 740. If a control command is received, the first terminal 100A transmits 735 the control command to the second terminal 100B causing the second terminal 100B to execute the control command. If a command to share data is received, the file (or other data) to be shared is selected and transmitted 745 to the second terminal 100B.

Figure 8:
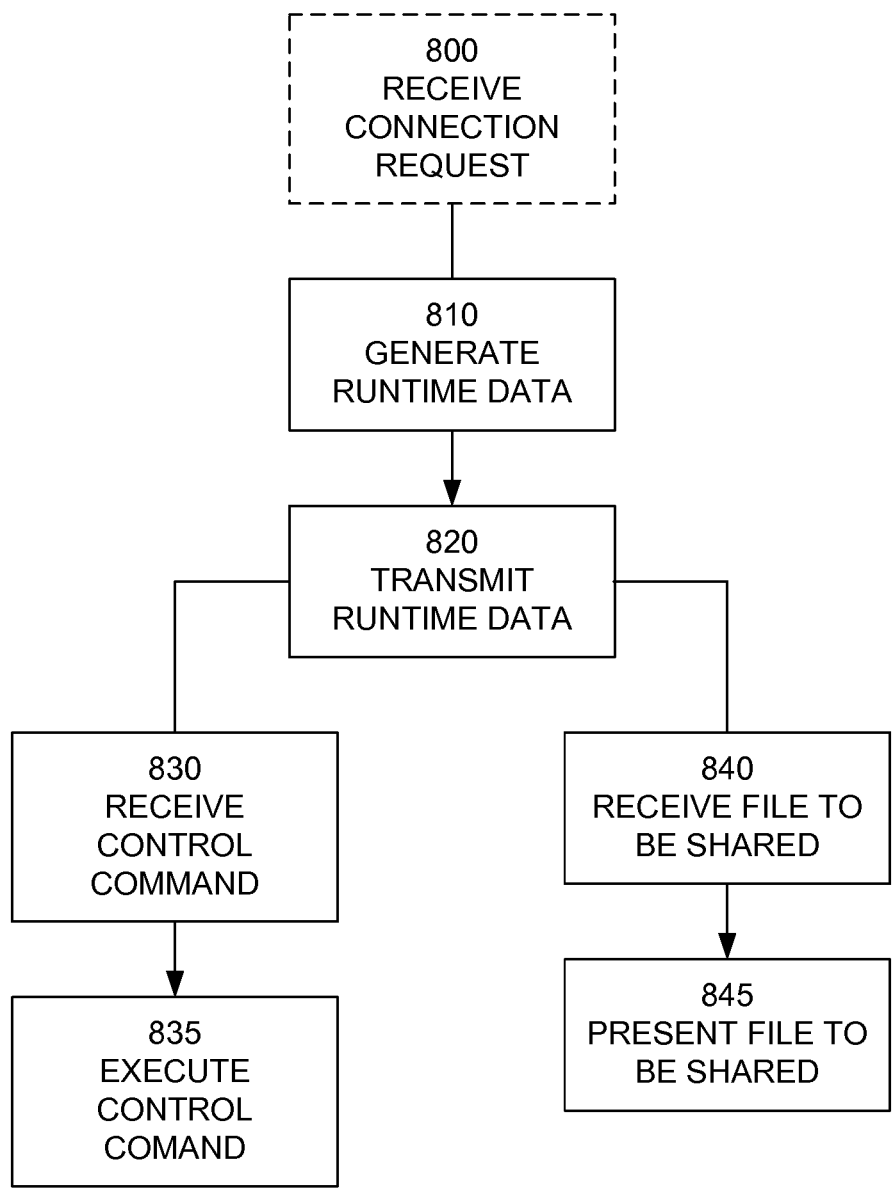
FIG. 8 shows a flowchart for a general method according to one embodiment of the teachings herein.

The operation of the second terminal 100B is shown in FIG. 8, being a flowchart for a general method according to one embodiment of the teachings herein.

The second terminal 100B generates or collects 810 the runtime data and transmits 820 the runtime data to the first terminal 100A. The runtime data may be collected continuously or upon a request received from the first terminal. Likewise, the runtime data may be transmitted regularly or upon a request by the first terminal 100A.

By not sending the runtime data only when an event, such as a low battery warning, occurs, the technically skilled user is able to monitor the technically inapt user's usage of the second terminal 100B more closely and possibly being able to prevent any event from arising.

The second terminal 100B then receives a control command 830 and/or a data file (or other data) to be shared, 840.

If a control command is received, 830, the second terminal 100B executes the control command, 835.

If a file (or other data) to be shared is received, 840, the second terminal 100B presents 845 the file (or other data) to be shared in a manner consistent with the type of file (or other data) to be shared. Possibly a prompt is presented first asking the technically inapt user if he is willing to accept the shared file and whether the shared file should be presented or stored for later presentation.

To setup a communication system 500 as in FIG. 5, the second terminal 100B is configured to receive a connection request 800 from the first terminal 100A. Alternatively or additionally, the first terminal 100A is configured to receive 700 a connection request from the second terminal 100B.

The connection request only needs to be transmitted once, as is indicated by the dashed line, and the connection does not need to be repeated every time runtime data is to be transmitted.

Upon accepting the request, the first terminal 100A is enabled to receive runtime data from the second terminal 100B and the second terminal 100B is enabled to receive shared files or other shared data and/or control commands from the first terminal 100A. The use of a connection request which has to be generated and sent by one of the terminals 100A, 100B and accepted by the other terminal 100B, 100A, will provide mutual security for the users of the terminals 100A, 100B and safeguard personal integrity.

The runtime data, control commands and/or the shared data files may be transmitted through a known protocol such as the Internet Protocol (IP), a text based protocol using short message service (SMS) messages or multimedia messages (MMS) messages, or a proprietary protocol.

The teachings herein have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mobile communications terminal comprising a user interface and a controller, wherein the mobile communications terminal is arranged with a remote assistance application for providing remote assistance to a second mobile communications terminal, and wherein the controller is configured to:
receive runtime data from the second mobile communications terminal in need of assistance, wherein the runtime data corresponds to a plurality of statuses of at least one application and/or at least one resource, the runtime data not being screen dumps, and wherein the second mobile communications terminal is configured to send the runtime data without being prompted to do so by the controller;
automatically compile a compiled overall status for the second mobile communications terminal based on the runtime data, the compiled overall status thereby relating to runtime data concerning several aspects whereby the plurality of runtime data are combined into one compiled overall status;
present the compiled overall status through the user interface;
receive user input through the user interface, the user input indicating a control command and/or data to be shared; and
if the user input indicates a control command, send the control command to the second mobile communications terminal, thereby causing the second mobile communications terminal to execute the control command, wherein the control command relates to a control function of the second mobile communications terminal thereby preventing full control of the second mobile communications terminal by only allowing control of a set of control functions, and
if the user input indicates data to be shared, send the data to be shared to the second mobile communications terminal, thereby causing the second mobile communications terminal to present the data to be shared.

2. The mobile communications terminal of claim 1, wherein the controller is further configured to present control command options corresponding to a control function to be executed by the second mobile communications terminal, wherein the user input indicating a control command is an actuation of a control command option, and wherein the second mobile communications terminal is caused to execute the control command by executing the corresponding control function.

3. The mobile communications terminal of claim 1, wherein the controller is further configured to compile the overall status based on the runtime data by ranking at least one aspect of the runtime data and compiling the overall status based on the ranking of the at least one aspect of the runtime data.

4. The mobile communications terminal according to claim 1, wherein the controller is further configured to compile the compiled overall status based on an average of the at least one aspect of the runtime data.

5. The mobile communications terminal according to claim 1, wherein the controller is further configured to compile the compiled overall status based on a lowest ranked of the at least one aspect of the runtime data.

6. The mobile communications terminal according to claim 1, wherein the controller is further configured to determine a proposed action to be taken and by finding a correlation between an aspect having a low ranking and an action, and indicating the proposed action to be taken through the user interface.

7. The mobile communications terminal according to claim 6, wherein the proposed action to be taken is to send a tutorial to the second mobile communications terminal, wherein the tutorial is correlated to an aspect of the runtime data.

8. The mobile communications terminal according to claim 7, wherein the tutorial to be sent to the second terminal is sent as an identifier to a downloadable tutorial to be downloaded by the second mobile communications terminal.

9. The mobile communications terminal according to claim 1, wherein the controller is further configured to receive a connection request from the second mobile communications terminal and upon accepting the request, enable the mobile communications terminal to receive runtime data from the second mobile communications terminal.

10. The mobile communications terminal according to claim 1, wherein the runtime data based memory consumption, battery level, battery consumption, missed calls, frequency of use for specific application(s), error messages received for application/action, memory usage, application usage, number of user interface actuations, such as key presses—both virtual and physical, for use of an application, number of unread messages, number of error messages received relating email.

11. A mobile communications terminal comprising a controller, wherein the controller is configured to:
collect runtime data wherein the runtime data corresponds to a plurality of statuses of at least one application and/or at least one resource, the runtime data not being screen dumps;
determine that the mobile communications terminal is in need of help;
transmit the runtime data from the mobile communications terminal to a first mobile communications terminal causing a compiled overall status for the mobile communications terminal to be automatically compiled based on the runtime data, the compiled overall status thereby relating to runtime data concerning several aspects whereby the plurality of runtime data are combined into one compiled overall status, and wherein the mobile communications terminal is configured to send the runtime data to the first mobile communications terminal without being prompted to do so by the first mobile communications terminal, and wherein the first mobile communications terminal is arranged with a remote assistance application for providing remote assistance to the mobile communications terminal;
receive a control command and/or data to be shared from the first mobile communications terminal; and
if a control command is received, execute the control command, and
if data to be shared is received, present the data to be shared.

12. The mobile communications terminal of claim 11, wherein the controller is further configured to receive a connection request from the first mobile communications terminal and upon accepting the request, enable the mobile communications terminal to receive shared files and/or control commands from the first mobile communications terminal.

13. A system comprising a first mobile communications terminal and a second mobile communications terminal, wherein the first mobile communications terminal is arranged with a remote assistance application for providing remote assistance to the second mobile communications terminal:
(a) wherein the second mobile communications terminal is configured to:
collect runtime data wherein the runtime data corresponds to a plurality of statuses of at least one application and/or at least one resource, the runtime data not being screen dumps; and
transmit the runtime data to the first mobile communications terminal without being prompted to do so by the first mobile communications terminal;
(b) wherein the first mobile communications terminal is configured to:
receive the runtime data from the second mobile communications terminal;
automatically compile a compiled overall status for the second mobile communications terminal based on the runtime data, the compiled overall status thereby relating to runtime data concerning several aspects whereby the plurality of runtime data are combined into one compiled overall status;
present the compiled overall status through a user interface;
receive user input through the user interface, the user input indicating a control command and/or data to be shared; and
if the user input indicates a control command, send the control command to the second mobile communications terminal, thereby causing the second mobile communications terminal to execute the control command, wherein the control command relates to a control function of the second mobile communications terminal thereby preventing full control of the second mobile communications terminal by only allowing control of a set of control functions, and
if the user input indicates data to be shared, send the data to be shared to the second mobile communications terminal, thereby causing the second mobile communications terminal to present the data to be shared; and
(c) wherein the second mobile communications terminal is further configured to:
receive the control command and/or the data to be shared from the first mobile communications terminal; and
if a control command is received, execute the control command, and/or
if data to be shared is received, present the data to be shared.

14. A method for using a mobile communications terminal comprising a user interface, wherein the mobile communications terminal is arranged with a remote assistance application for providing remote assistance to the second mobile communications terminal, wherein the method comprises:
receiving runtime data from the second mobile communications terminal in need of assistance, wherein the runtime data corresponds to a plurality of statuses of at least one application and/or at least one resource, the runtime data not being screen dumps, and wherein the second mobile communication terminal is configured to send the runtime data without being prompted to do so by the controller;
automatically compiling a compiled overall status for the second mobile communications terminal based on the runtime data, the compiled overall status thereby relating to runtime data concerning several aspects whereby the plurality of runtime data are combined into one compiled overall status;
presenting the compiled overall status through the user interface;
receiving user input through the user interface, the user input indicating a control command and/or data to be shared; and
if the user input indicates a control command, sending the control command to the second mobile communications terminal, thereby causing the second mobile communications terminal to execute the control command, wherein the control command relates to a control function of the second mobile communications terminal thereby preventing full control of the second mobile communications terminal by only allowing control of a set of control functions, and
if the user input indicates data to be shared, sending the data to be shared to the second mobile communications terminal, thereby causing the second mobile communications terminal to present the data to be shared.

15. A non-transitory computer-readable storage medium encoded with instructions that, when executed on a processor, perform the method according to claim 14.

16. A method for using a mobile communications terminal, wherein the method comprises:
collecting runtime data, wherein the runtime data corresponds to a plurality of statuses of at least one application and/or at least one resource, the runtime data not being screen dumps;
determining that the mobile communications terminal is in need of assistance;
transmitting the runtime data from the mobile communications terminal to a first mobile communications terminal causing a compiled overall status for the mobile communications terminal to be automatically compiled based on the runtime data, the compiled overall status thereby relating to runtime data concerning several aspects whereby the plurality of runtime data are combined into one compiled overall status, and wherein the mobile communications terminal is configured to send the runtime data to the first mobile communications terminal without being prompted to do so by the first mobile communications terminal, wherein the first mobile communications terminal is arranged with a remote assistance application for providing remote assistance to the mobile communications terminal in need of assistance;

receiving a control command and/or data to be shared from the first mobile communications terminal; and if a control command is received, executing the control command, and/or if data to be shared is received, presenting the data to be shared.

17. A method for using a system comprising a first mobile communications terminal and a second mobile communications terminal, wherein the first mobile communications terminal is arranged with a remote assistance application for providing remote assistance to the second mobile communications terminal wherein the method comprises:

the second mobile communications terminal collecting runtime data, wherein the runtime data corresponds to a plurality of statuses of at least one application and/or at least one resource, the runtime data not being screen dumps; and transmitting the runtime data from the second mobile communications terminal to the first mobile communications terminal without being prompted to do so by the first communications terminal;

the first mobile communications terminal receiving the runtime data from the second mobile communications terminal;

automatically compiling a compiled overall status for the second mobile communications terminal based on the runtime data, the compiled overall status thereby relating to runtime data concerning several aspects whereby the plurality of runtime data are combined into one compiled overall status;

presenting the compiled overall status through a user interface;

receiving user input through the user interface, the user input indicating a control command and/or data to be shared; and if the user input indicates a control command, sending the control command to the second mobile communications terminal, thereby causing the second mobile communications terminal to execute the control command, wherein the control command relates to a control function of the second mobile communications terminal thereby preventing full control of the second mobile communications terminal by only allowing control of a set of control functions, and if the user input indicates data to be shared, sending the data to be shared to the second mobile communications terminal, thereby causing the second mobile communications terminal to present the data to be shared, and wherein the method further comprises:

the second mobile communications terminal receiving the control command and/or the data to be shared from the first mobile communications terminal; and if a control command is received, executing the control command, and/or if data to be shared is received, presenting the data to be shared.

\* \* \* \* \*